United States Patent [19]

Fuentes

[11] Patent Number: 5,351,654
[45] Date of Patent: Oct. 4, 1994

[54] LEAD AND TETHERING DEVICE

[76] Inventor: Eileen M. Fuentes, 4418 Forman Ave., Toluca Lake, Calif. 91602-2505

[21] Appl. No.: 111,172

[22] Filed: Aug. 25, 1993

[51] Int. Cl.⁵ .................................................. A01K 3/00
[52] U.S. Cl. ..................................... 119/770; 119/795
[58] Field of Search ............... 119/770, 771, 792, 793, 119/797, 798, 795

[56] References Cited

U.S. PATENT DOCUMENTS

| | | | |
|---|---|---|---|
| 3,426,559 | 2/1969 | Schubach et al. | 119/770 X |
| 3,752,127 | 8/1973 | Baker | 119/797 |
| 4,879,972 | 11/1989 | Crowe et al. | 119/792 |

FOREIGN PATENT DOCUMENTS

| | | | |
|---|---|---|---|
| 1195084 | 6/1965 | Fed. Rep. of Germany | 119/793 |
| 202436 | 8/1923 | United Kingdom | 119/793 |

*Primary Examiner*—Robert P. Swiatek
*Attorney, Agent, or Firm*—John J. Connors

[57] ABSTRACT

A lead and tethering device 10 or 50 including a pair of connected looped straps, one serving as the connecting strap 12 to which an animal or child being tethered is connected, and the other a holding strap 14 which the user grips. A spacer element 22 at the looped end of the connecting strap inhibits this looped end from completely collapsing upon itself when subjected to tension. At the other end of the connecting strap is a clasp member 20 that preferably swivels and is adapted to be attached and detached to an animal or child being tethered. One or more D rings 17, 32, and 54 are disposed along the length of the device. The holding strap 14 is elongated and has one end connected directly to the connecting strap, or to an intermediate looped strap 52, and a remote end to which another clasp 33 is connected. This second clasp 33 is adapted to be attached and detached to one of the rings 17, 32, and 54, forming a looped strap when attached to one of these rings.

20 Claims, 7 Drawing Sheets

LEAD AND TETHERING DEVICE

BACKGROUND OF THE INVENTION

1. Field of the Invention

This invention relates to a lead and tethering device for animals, particularly dogs, or even small children.

2. Background Discussion

Leads and tethering devices are well known tools used to restrain the movement of animals or even small children. Typically, they are an elongated strap which has a looped end which the user holds and at the other end is a clasp that is attached to, for example, the collar of a dog. From time to time these devices are designed to have a multiple attachment leash that allows several animals to be attached to a single lead.

The problem with conventional leads and tethering devices is that they are not particularly designed to enable a lightweight user such as a woman to grip effectively the lead and restrain and control a large animal. Moreover, these leads are usually of a standard length and their length cannot be easily varied. Another drawback is that they are not conveniently adapted to be attached to a post or around the user's waist.

SUMMARY OF THE INVENTION

It is the objective of this invention to provide a lead and tethering device that overcomes the problems of conventional devices, and is especially adapted to (1) enable the user to vary the length of the device, effectively exerting a restraining force on the tethered animal or child, (2) easily grip different looped sections of the device, and (3) attach the device to a stationary object such as a post or tree.

The device of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENTS," one will understand how the features of this invention provide its advantages, which include simplicity of use and manufacture, versatility, improved restraining capability.

The first feature of this invention is that it includes at least a pair of looped straps connected together from end to end. One of these straps serves as the connecting strap to which an animal or child being tethered is connected. This connection may be achieved either directly or indirectly through an extension leash, for example, a leash that has opposed ends, each connected to one of a pair of animals. The other strap serves as a holding strap that the user grips. This holding strap is an elongated member having one end connected to the looped portion of the connecting strap and another end to which a clasp is attached. Preferably this clasp does not swivel. Because this clasp does not swivel the holding end does not tend to twist up upon itself. The holding strap is formed into a loop when the clasp is connected to a ring associated with the holding strap nearby the looped portion of the connecting strap or another ring located at a different position on the connecting strap, for example near the connecting strap's terminal end opposed to the loop portion of this strap. This enables the length of the lead and tethering device to be easily varied.

The second feature is that there is a spacer element at the looped portion of the connecting strap which inhibits this looped portion from completely collapsing upon itself when subjected to tension. In one embodiment of this invention, the holding strap is connected directly to the looped portion of the connecting strap. In an alternate embodiment, the connecting strap and holding strap are connected together by one or more intermediate looped straps. In the alternate embodiment, the intermediate looped straps may also each employ a spacer element to prevent complete collapse of the intermediate looped straps when subjected to tension. The spacer element may be a separate, rigid piece which is sewn or otherwise connected to the looped straps, or it may be formed from the strap material by folding the strap material upon itself.

The third feature is that other ring members are disposed along the length of the lead and tethering device of this invention. Preferably, there is a ring member near the clasp member at the end of the terminal strap opposed to the loop portion. In the alternate embodiment, there is a ring member near at least some of the points of connection between intermediate straps. This enables the holding strap to be attached to different rings to adjust the overall length of the device and the diameter of the loop of the holding strap. This is useful if, for example, the user wished to wrap the holding strap about the trunk of a tree or other large diameter stationary object.

The fourth feature is that there is at the terminal end of the connecting strap another clasp that is adapted to be attached and detached to the animal or child being tethered. Preferably, this clasp swivels.

The fifth feature is that several to the lead and tethering devices of this invention may be connected together to provide additional length.

The sixth feature is that the device is easy to construct from a single, elongated piece of strap material by looping the material back upon itself, and fastening intermediate sections together to form the looped straps- Although this is the preferred method of construction, the looped straps could be individually constructed and then connected end to end.

DESCRIPTION OF THE DRAWING

The preferred embodiments of this invention, illustrating all its features, will now be discussed in detail. These embodiments depict the novel and non-obvious device of this invention shown in the accompanying drawing, which is for illustrative purposes only. This drawing includes the following figures (FIGS.), with like numerals indicating like parts:

FIG. 10A shows the first step of the method where the connecting strap is formed by looping elongated strap material back upon itself, with the clasp at the end of the connecting strap being secured to that portion strap material fed through a slot in the clasp;

FIG. 10B shows the second step of the method where unequal lengths of two segments of strap material are fastened together at spaced apart intermediate points; and FIG. 10C shows the third step of the method where the holding strap is formed by looping the longer of the strap material segments back upon itself.

FIG. 11A shows the elongated strap material being folded upon itself similar to that in FIGS. 10A-10C, expect an intermediate segment is folded upon itself once to create an overlapped section;

FIG. 11B shows the overlapped section again folded upon itself to create four folds; and FIG. 11C shows the four folds pressed together and connected to form the spacer element.

DESCRIPTION OF THE PREFERRED EMBODIMENTS

First Embodiment

Figure 1:
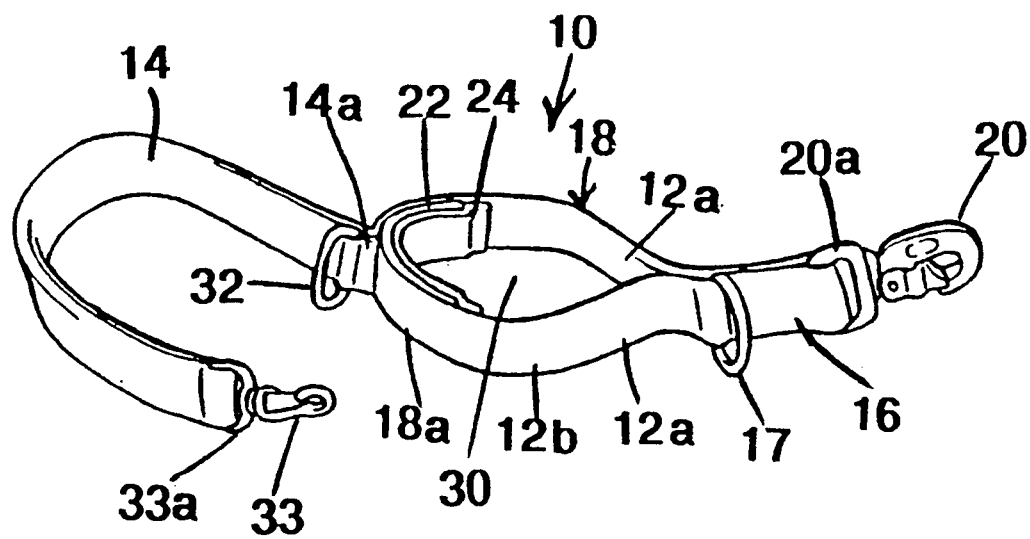
FIG. 1 is a perspective view of the first embodiment of this invention where a pair of looped straps are employed.
Figure 2:
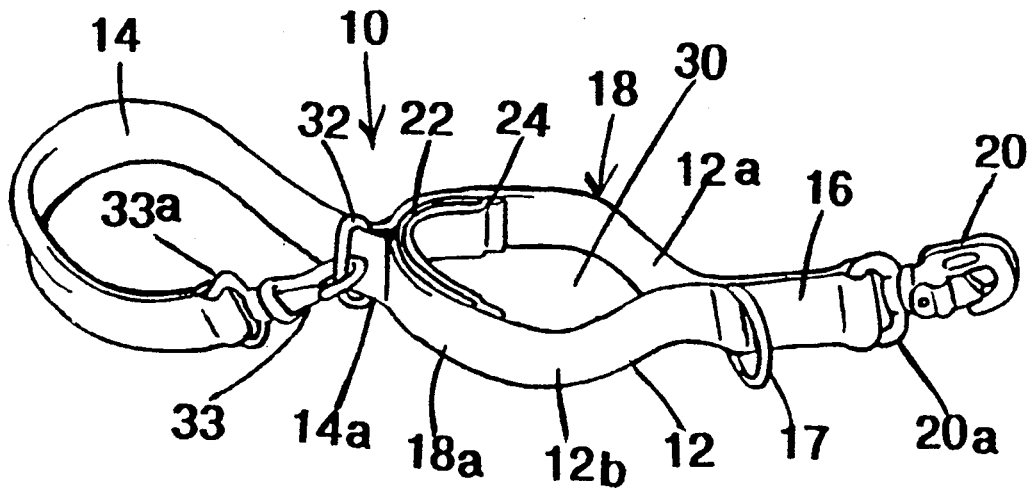
FIG. 2 is a perspective view of the device shown in FIG. 1 where its holding strap is attached to a ring near the looped portion of the connecting strap to provide a first configuration of the device of this invention.
Figure 3:
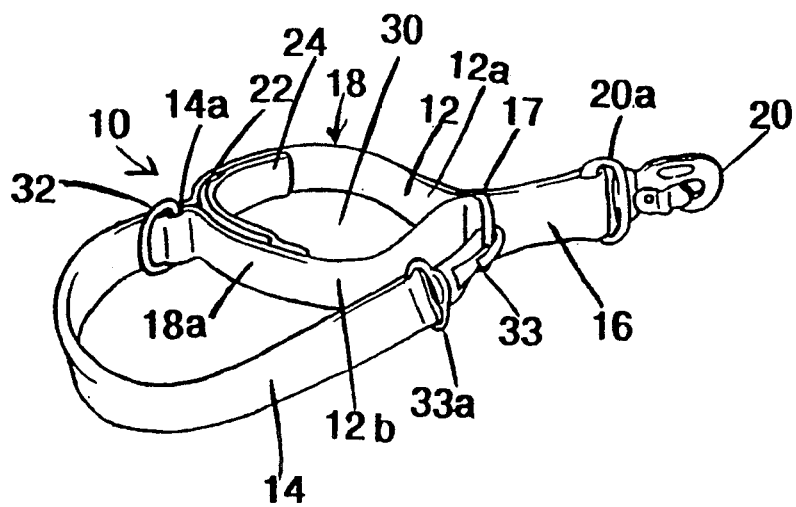
FIG. 3 is a perspective view similar to that shown in FIGS. 1 and 2, except the holding strap has been reconnected to a ring near the terminal end of the connecting strap.

As best illustrated in FIGS. 1 through 3, the first embodiment of the lead and tethering device of this invention, device 10, includes a pair of looped straps 12 and 14 connected together from end to end. The looped strap 12 is designated as the connecting strap and the looped strap 14 is designated as the holding strap. The connecting and holding straps 12 and 14 are each made of, for example, a woven nylon material. Suitable strap material may be purchased from California Webbing, Inc. of Los Angeles, Calif. Other suitable strap material may be leather, chain, woven cotton, etc.

In the connecting strap 12, the webbing material is looped upon itself and sewn together to form a tail 16 at one end and a loop 18 at the other end 18a. On an intermediate section of the tail 16, near where the loop commences, is sewn into position a D ring 17. At the very end of the tail is a clasp, preferably of the type that swivels. A suitable clasp 20 can be purchased from Intra West, Inc. of Costa Mesa, Calif. The tail 16 comprises overlapping strap material sewn together, with a section of the overlapping material passing through a slot 20a in the clasp 20. Consequently, the clasp 20 is firmly held by the tail 16 and does not move. The clasp 20 may swivel in either direction 360 degrees.

Figure 9:
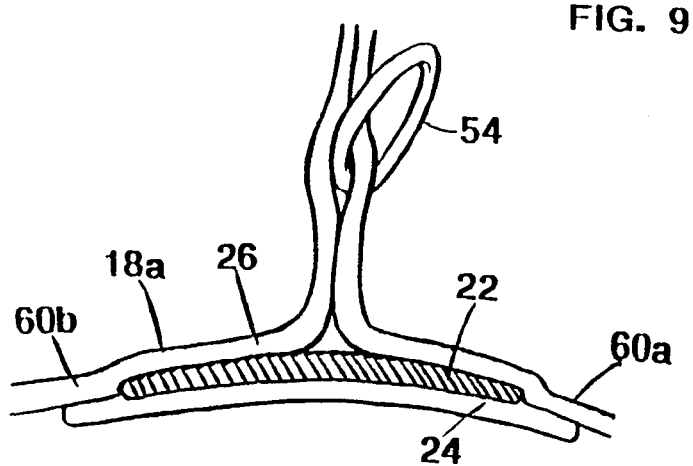
FIG. 9 is a cross-sectional view of the looped end of the connecting strap, illustrating the position of the spacer element.
Figure 5:
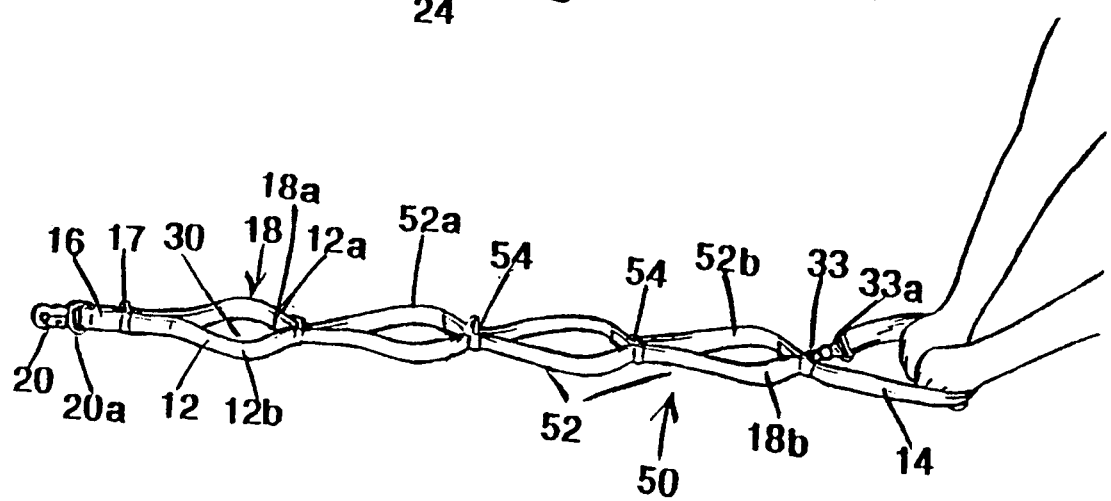
FIG. 5 is a perspective view similar to that shown in FIG. 4 except the holding strap is connected and the user is grasping the holding strap by one end and an animal (not shown) is connected to the other end creating tension in the device.
Figure 8:
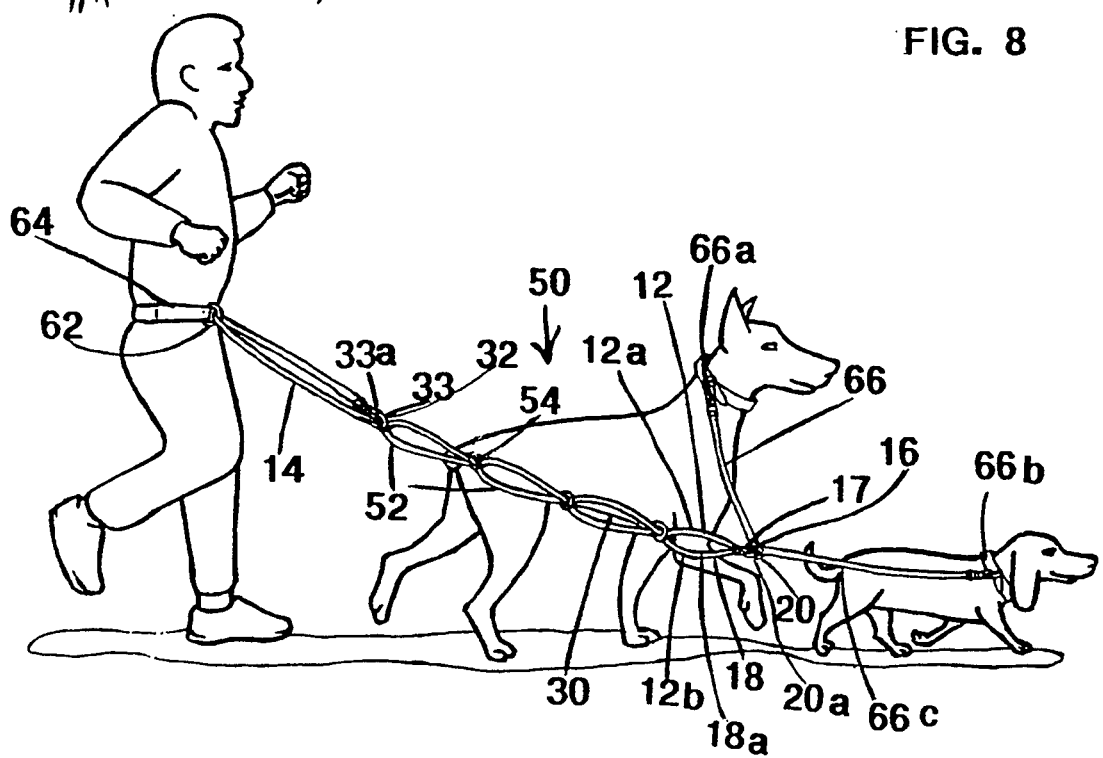
FIG. 8 is a perspective view showing a user having one end of the lead and tethering device of this invention connected to the user's belt and the other end indirectly to two dogs by a leash with two connecting ends and an intermediate portion fed through the D ring near the end of the connecting strap.

As best illustrated in FIG. 9, the looped end 18a of the connecting strap 12 has a spacer element 22 positioned between the strap material. The inside fabric piece 24 is sewn to the outside fabric piece 26 to hold the spacer element 24 securely in position so it does not move. This spacer may be any rigid material, for example, polypropylene webbing coated with polyurethane. A suitable spacer element 24 can be purchased from Bio Thane, Inc. of North Ridgeville, Ohio. Consequently, when the loop 18 is in tension as depicted in FIGS. 5 and 8, the spacer element 22 keeps the two strap segments 12a and 12b of the strap 12 spaced apart. This enables the user to grip the loop 18 if necessary, providing a space 30 between the strap segments 12a and 12b that allows the user's hand to be positioned between these strap segments.

As best shown in FIG. 1, the holding strap 14 is elongated, having a tail end 14a connected by sewing to the looped end 18a of the connecting strap 12, and a clasp 33 at the other terminal end of the strap 14. This clasp 33 is slightly different from the other clasp 20 and preferably does not although it could swivel. A suitable clasp 33 for the connecting strap 14 may be purchased from Intra West, Inc. of Costa Mesa, Calif. This clasp 33 has a slot 33a through which the material is looped. There is attached to this tail end 14a a D ring 32. The D ring 32 is fastened, for example, by sewing or riveting, in position between two overlapping fabric sections forming the holding strap 14. This clasp 33 is adapted to be attached and detached to the D ring 32 as illustrated in FIG. 2 or the D ring 17 as illustrated in FIG. 3. This gives the device 10 versatility as will be discussed in greater detail subsequently.

Alternate Embodiment

Figure 4:
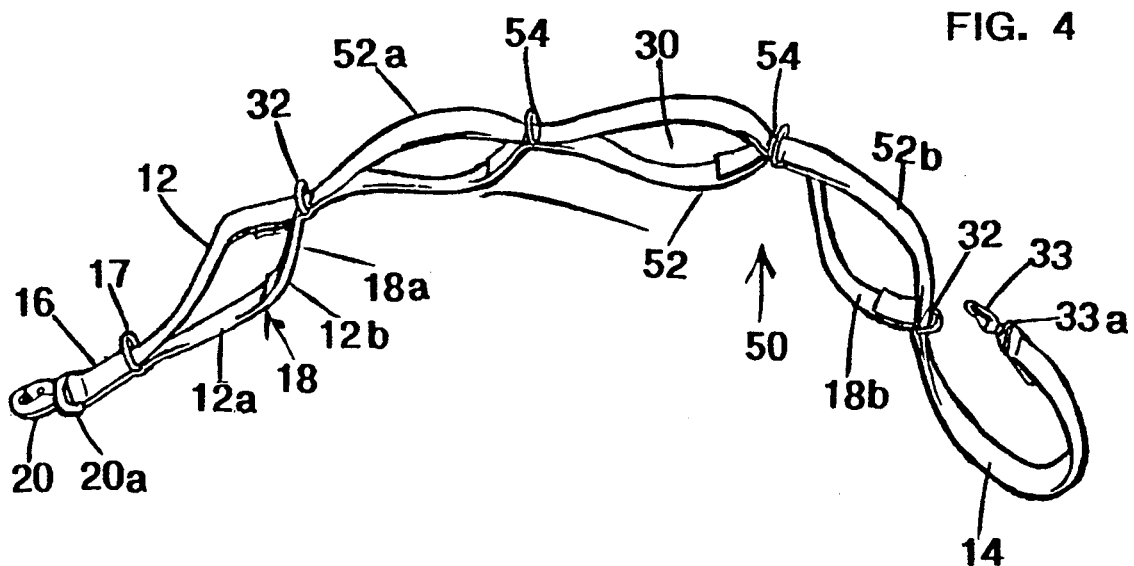
FIG. 4 is a perspective view of an alternate embodiment of this invention employing several intermediate loop straps between the terminal connecting strap and the terminal holding strap.
Figure 6:
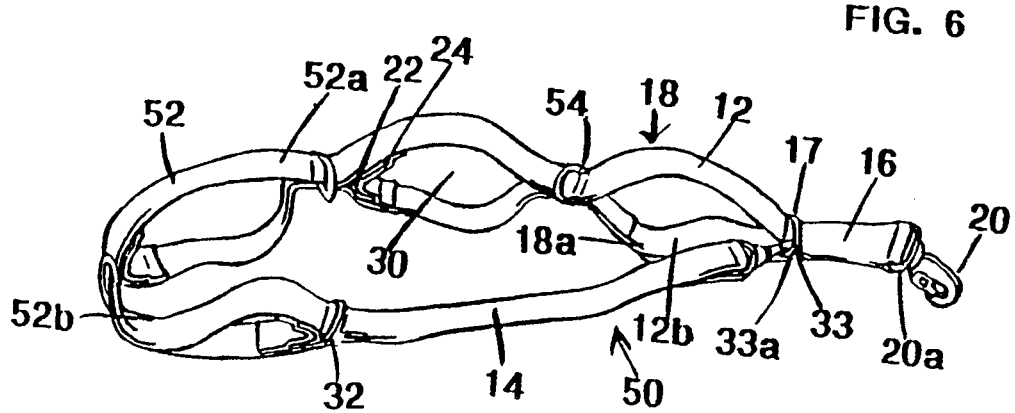
FIG. 6 is a perspective view of the embodiment shown in FIGS. 4 and 5 except the holding strap is attached to a ring near the end of the connecting strap.

FIGS. 4 through 6 illustrate an alternate embodiment of this invention, device 50, where one or more intermediate loop straps 52 are connected between the connecting strap 12 and holding strap 14. In this embodiment, the connecting strap 12 and the holding strap 14 are essentially the same as depicted in FIG. 1 although the holding strap 14 also can have a spacer element 22 if desired. The main difference between these two embodiments is the intermediate loop straps 52. One intermediate strap 52a is connected to the looped end 18a of the connecting strap 12, and another intermediate strap 52b has its looped end 18b connected to the holding strap 14. Each intermediate loop strap 52 is a closed loop which has at one end a looped section with an adjacent D ring 54 fastened in position. Each of these straps 52 preferably includes a spacer element 22 as depicted in FIG. 9 near the looped end sections. This prevents the loops from completely closing upon themselves when under tension as illustrated in FIGS. 5 and 8. FIG. 6 illustrates the versatility of this strap, allowing the holding strap 14 to be detached from, for example, the ring 17 as shown in FIG. 6 and connected to the ring 32 at the end of the connecting strap 12.

Figure 7:
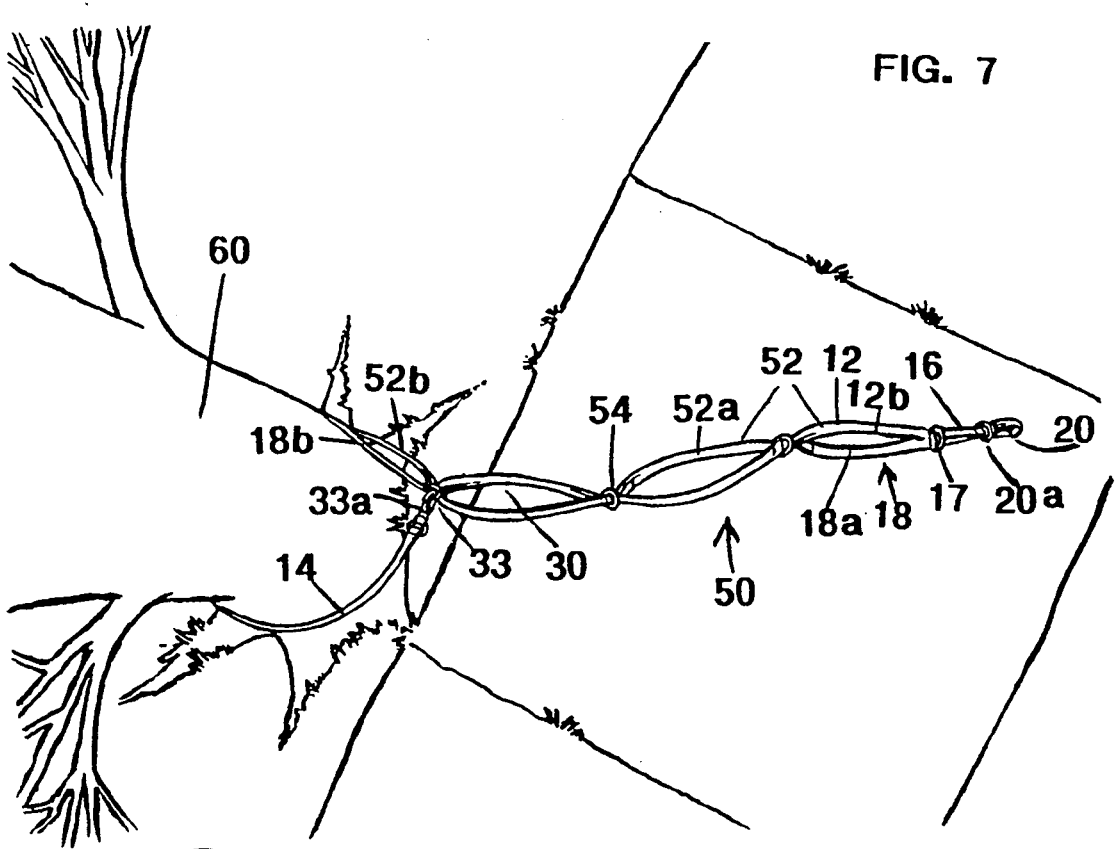
FIG. 7 is a birds-eye view of the lead and tethering device of this invention connected to a tree.
Figure 8A:
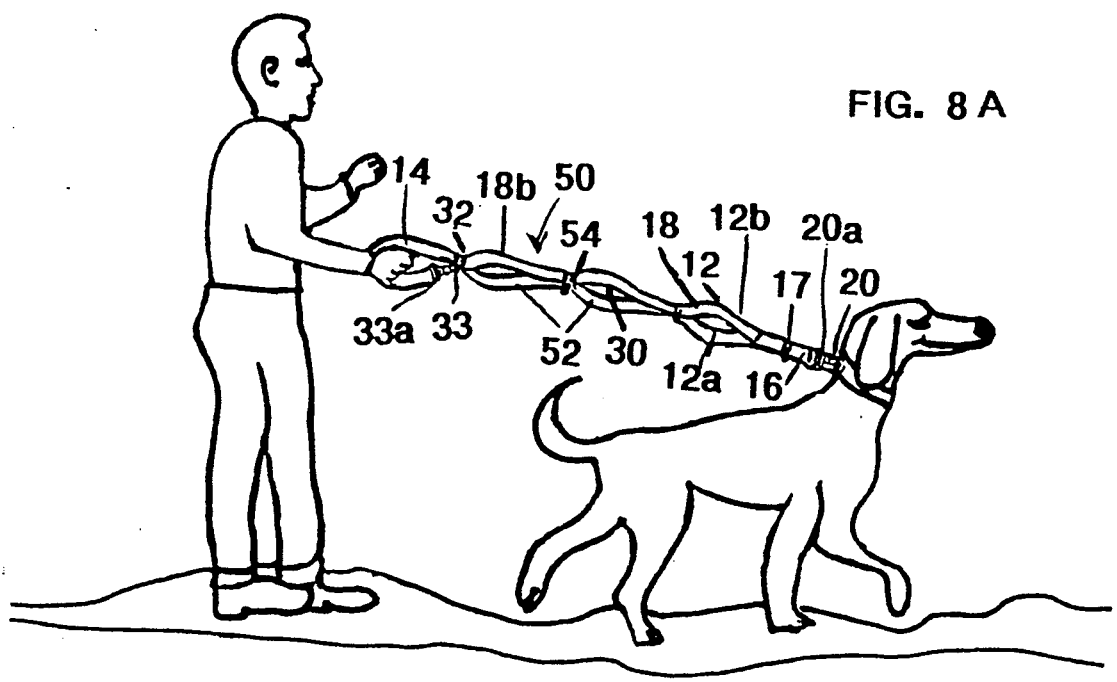
FIG. 8A is a perspective view showing a user grasping the lead and tethering device of this invention at one end to restrain a dog.
Figure 8B:
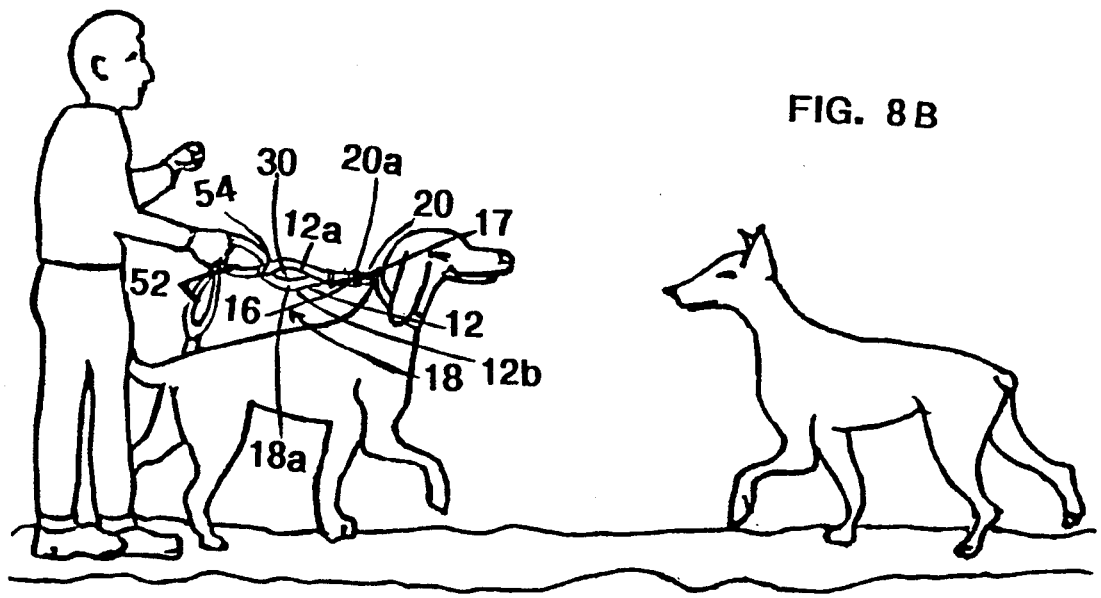
FIG. 8B is a perspective view showing a user in FIG. 8A grasping the lead and tethering device of this invention at an intermediate loop to better control and restrain the dog.

In FIG. 7, the lead and tethering device 50 is depicted connected to a tree 60 where the holding strap 14 has been unlatched by detaching the clasp 33 from the ring 17 to allow the holding strap to be wrapped around the tree and then reconnecting the clasp to, for example, the D ring 32 of the holding strap 14. If the tree trunk has a large diameter, the clasp 33 would reconnected to one of the D-rings on the intermediate straps 52. The holding strap 14 could also be connected to, for example, a belt 64 worn by the user by looping the detached holding strap through a ring 62 on the belt and then connecting the clasp 33 to the D ring 32. A coupler 66 may be used with the lead and tethering device 50. The coupler 66 has two terminal connecting ends 66a and 66b, and an attached D ring (not shown) near the center of the coupler. Each end 66a and 66b is connected to the dog collars of the two dogs. Typically, as shown in FIG. 8A, a user grasps the lead and tethering device 50 at the holding end 14. As shown in FIG. 8B, when required, the user grasps an intermediate loop 52 to better control and restrain the dog.

Methods of Construction

Figure 10A:
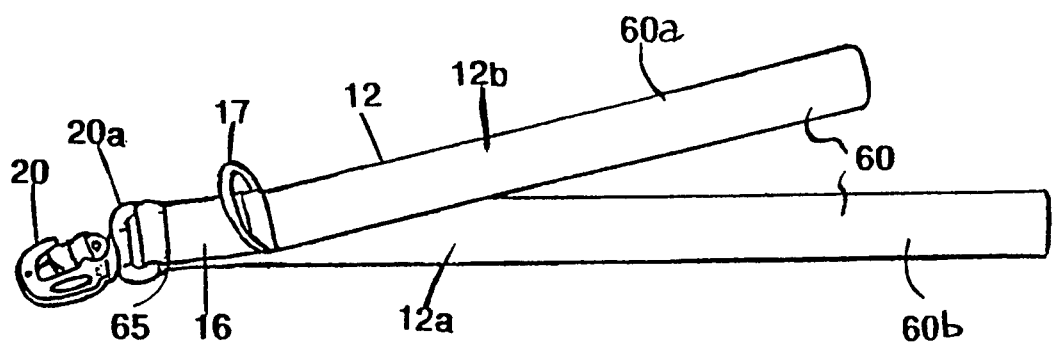
FIGS. 10A, 10B and 10C depict schematically one method of making the lead and tethering device of this invention, where
Figure 10B:
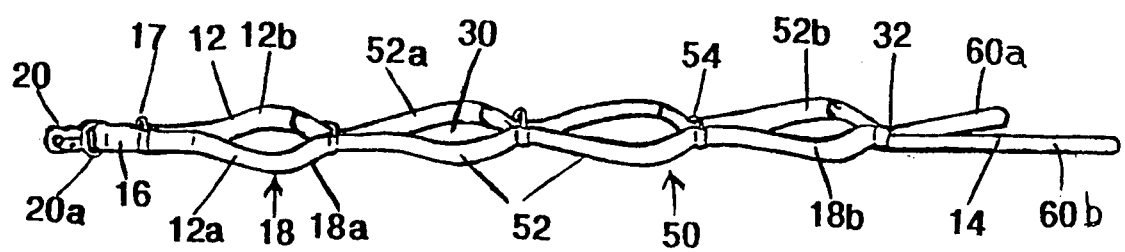
Figure 10C:
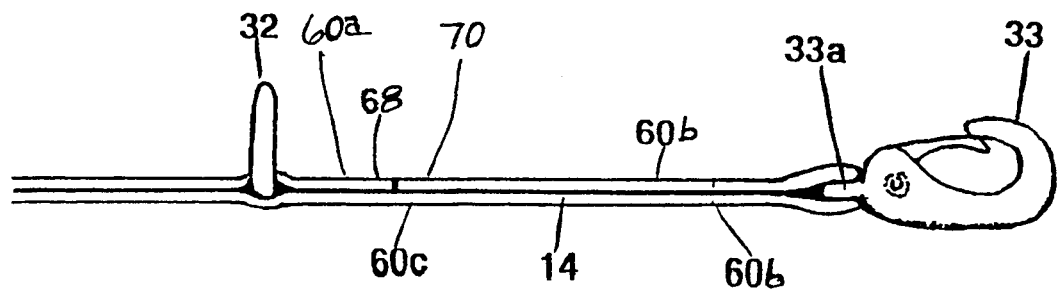

FIGS. 10A, 10B and 10C depict one preferred method of making the lead and tethering device 50 of this invention, however, device 10 could be made in a similar manner.

FIG. 10A illustrates the first step of the method where the connecting strap 12 is formed by looping elongated strap material 60 back upon itself. The strap material 60 is fed through the slot 20a in the clasp 20 in two unequal lengths, with the segment 60b being longer than the segment 60a. The clasp 20 is secured in position at the end of the connecting strap 12 by fastening together the portions of the segments 60a and 60b adjacent the clasp. Rivets may be used or the material 60 may be sewn along a seam 65.

FIG. 10B illustrates the second step of the method where unequal lengths of two segments 60a and 60b of strap material are fastened together at spaced apart intermediate points. First, the segment 60b is fed through rings 17, 32, and 54, which are spaced apart along this segment 60b. Next, the two segments 60a and 60b are then brought into an abutting relationship and portions of the segments on each side of the rings 17, 32, and 54 are fastened together so that these rings cannot move along the length of the device 50.

FIG. 10C illustrates the third step of the method where the holding strap 14 is formed by looping the longer segment 60b of back upon itself, looping it through the slot 33a of the clasp 33. The end 68 of the segment 60a is moved into an abutting position against the end 70 of the segment 60b, and then these ends are fastened to the underlying portion 60c of the segment 60b. The overlying portions of segment 60b adjacent the clasp 33 are also fastened together.

Figure 11A:
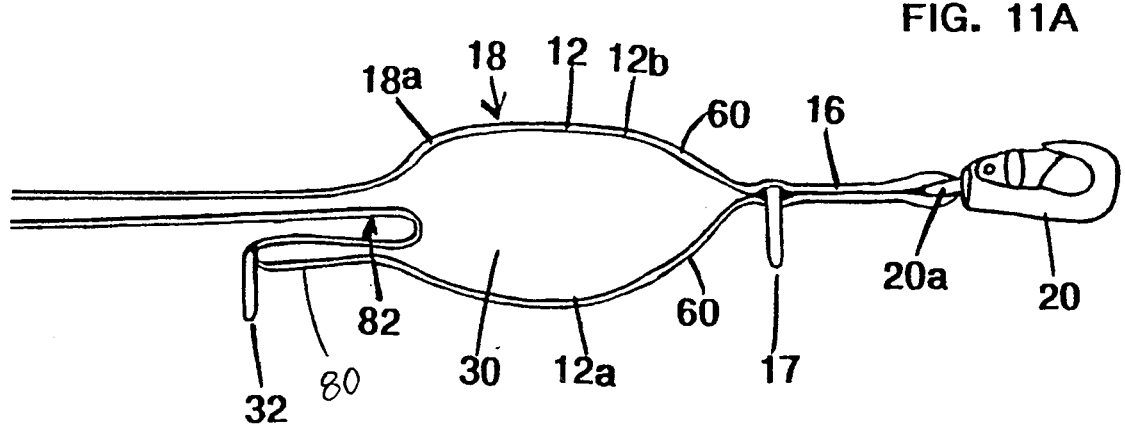
FIGS. 11A through 11C illustrate an alternate way to form the rigid spacer element at the looped ends of the straps, where
Figure 11B:
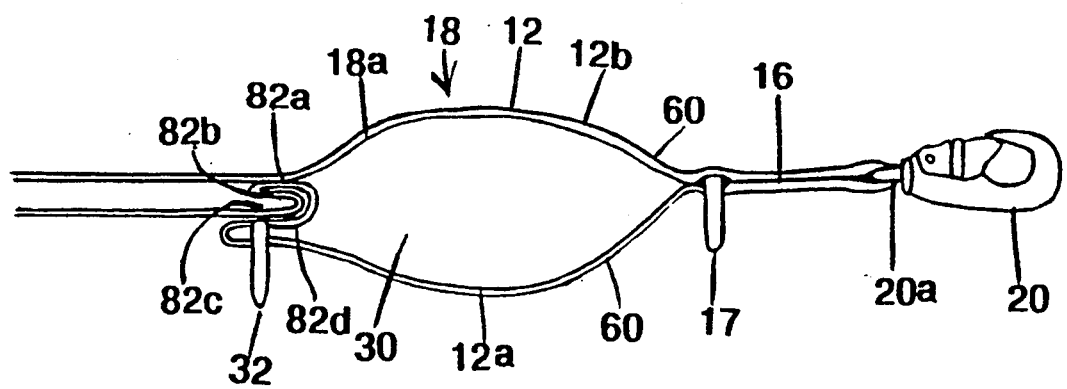
Figure 11C:
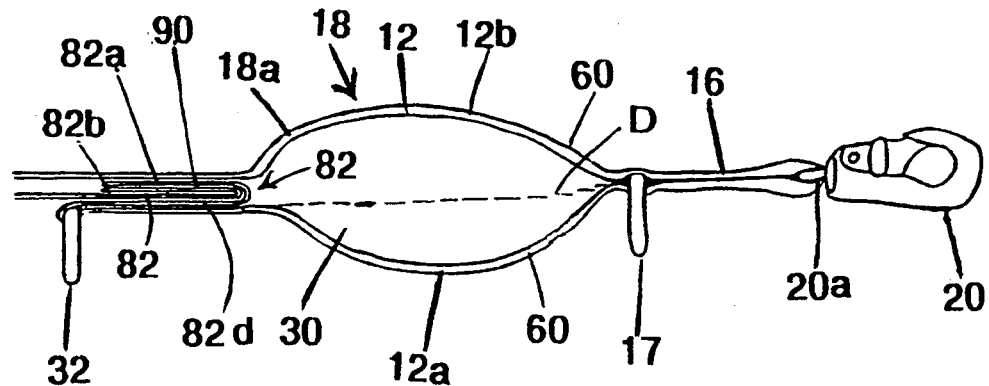

FIGS. 11A through 11C illustrate an alternate way to make a looped strap and a rigid spacer element at the looped ends of the straps by repeatedly folding in upon itself the strap material 60. FIG. 11A shows the elongated strap material 60 being folded upon itself similar to that in FIGS. 10A–10C, expect an intermediate segment 80 is folded upon itself once to create an overlapped section 82. FIG. 11B shows the overlapped section 82 again folded upon itself to create four folds 82a through 82d. FIG. 11C shows the four folds pressed together and connected, for example by rivets or by sewing, to form the spacer element 90 made of the strap material 60. This provides a substantially rigid spacer element 90. Alternately, one of the two strap segments 12a or 12b, for example, strap segment 12a, could lie along a straight line as illustrated by the dotted line D in FIG. 11C.

These methods of constructing the device 50 employ a single, elongated strap material from which the connecting strap 12, holding strap 14, and intermediate looped straps 52 are formed. The connecting strap 12, holding strap 14, and intermediate looped straps 52, however could be made as separate units and then connected together.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

I claim:

1. A lead and tethering device, including
   a pair of terminal looped straps connected by one or more intermediate looped straps to form a chain of straps connected together from end to end,
   one of said terminal straps serving as a connecting strap to which an animal or child being tethered is connected, and the other of said terminal straps serving as a holding strap, said connecting strap having opposed ends, one of which is looped,
   a spacer element at the looped end of said connecting strap which inhibits said looped end from completely collapsing upon itself when subjected to tension, and at the other end of said connecting strap a first clasp member and is adapted to be attached and detached to an animal or child being tethered,
   said holding strap being connected to a looped end of an intermediate strap and including a ring member near the looped end of the intermediate strap and having a remote end with a second clasp member attached thereto,
   said second clasp member being adapted to be attached and detached to the ring member to form the holding strap into a loop when so attached to the ring member.

2. The lead and tethering device of claim 1 where there is a second ring member near the first clasp member.

3. The lead and tethering device of claim 1 where there is a ring member near at least some of the points of connection between the one or more intermediate straps.

4. The lead and tethering device of claim 1 where each of the intermediate straps has a spacer element which inhibits the loop of the one or more intermediate strap from completely collapsing upon itself when subjected to tension.

5. The lead and tethering device of claim 1 where the first clasp member swivels.

6. The lead and tethering device of claim 1 where the second clasp member swivels.

7. The lead and tethering device of claim 1 where the terminal looped straps and intermediate looped straps are constructed from a single, elongated piece of strap material by looping the material back upon itself, and fastening the one or more intermediate sections together to form said terminal looped straps and intermediate looped straps.

8. The lead and tethering device of claim 1 where the spacer element is formed of strap material folded upon itself to provide a substantially rigid member.

9. A lead and tethering device, including
a pair of terminal looped straps connected by one or more intermediate looped straps to form a chain of straps connected together from end to end,
one of said terminal straps serving as a connecting strap to which an animal or child being tethered is connected, and the other of said terminal straps serving as a holding strap, and
at least one ring member near a point of connection between the straps,
said connecting strap having opposed ends, one end being looped and the other end serving as a terminal end to which is connected a first clasp member adapted to be attached and detached to an animal or child being tethered,
said holding strap being connected to a looped end of an intermediate strap and having a remote end with a second clasp member attached thereto,
said second clasp member being adapted to be attached and detached to the ring member to form the holding strap into a loop when so attached to the ring member.

10. The lead and tethering device of claim 9 including a holding strap ring member near the looped end of an intermediate strap.

11. The lead and tethering device of claim 9 including a connecting strap ring member near the looped end of the connecting strap.

12. The lead and tethering device of claim 9 where the first clasp member swivels.

13. The lead and tethering device of claim 9 where the second clasp member does not swivel.

14. The lead and tethering device of claim 9 where said terminal looped straps and said intermediate straps each having a spacer element at the respective looped ends of said terminal and intermediate straps which inhibits said looped ends from completely collapsing upon themselves when subjected to tension, 15. A lead and tethering device, including
a ring member along the length of the device,
at least a pair of looped straps connected together from end to end,
one of said straps serving as a holding strap which the user grips, and the other strap serving as a connecting strap to which an animal or child being tethered is connected, said connecting strap having opposed ends, one of which is looped and the other having a first clasp member that is adapted to be attached and detached to an animal or child being tethered,
the holding strap being elongated and having one end connected to the looped end of the connecting strap and an opposed terminal end with a second clasp member attached to said terminal end,
said second clasp member being adapted to be attached and detached to the ring member, forming a looped strap when attached to the ring member.

16. The lead and tethering device of claim 15 including a spacer element at the looped end of said connecting strap which inhibits said looped end from completely collapsing upon itself when subjected to tension.

17. The lead and tethering device of claim 15 where the first clasp member swivels.

18. The lead and tethering device of claim 15 where the second clasp member does not swivel.

19. The lead and tethering device of claim 15 where the ring member is near the point of connection between the connecting and holding straps.

20. The lead and tethering device of claim 15 where the looped straps are constructed from a single, elongated piece of strap material by looping the material back upon itself, and fastening intermediate sections together to form said looped straps.

* * * * *